United States Patent
Cao et al.

(10) Patent No.: US 10,453,188 B2
(45) Date of Patent: Oct. 22, 2019

(54) METHODS AND DEVICES FOR IMPROVING IMAGE QUALITY BASED ON SYNTHESIZED PIXEL VALUES

(71) Applicant: SZ DJI TECHNOLOGY CO., LTD., Shenzhen (CN)

(72) Inventors: Zisheng Cao, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/374,810

(22) Filed: Dec. 9, 2016

(65) Prior Publication Data

US 2017/0091909 A1 Mar. 30, 2017

Related U.S. Application Data

(63) Continuation of application No. PCT/CN2014/079778, filed on Jun. 12, 2014.

(51) Int. Cl.
*G06T 5/00* (2006.01)
*G06T 5/50* (2006.01)
(Continued)

(52) U.S. Cl.
CPC ........... *G06T 5/008* (2013.01); *G06T 5/50* (2013.01); *H04N 5/217* (2013.01);
(Continued)

(58) Field of Classification Search
USPC ...... 347/133; 348/207.1, 239, 241; 382/131, 382/266
See application file for complete search history.

(56) References Cited

U.S. PATENT DOCUMENTS 6,204,881 B1  3/2001 Ikeda et al.
7,106,913 B2 * 9/2006 Castorina .............. G06T 5/50
                                                        345/629
(Continued)

FOREIGN PATENT DOCUMENTS

CN    101394485 A    3/2009
CN    101448086 A    6/2009
(Continued)

OTHER PUBLICATIONS

The World Intellectual Property Organization (WIPO) International Search Report for PCT/CN2014/079778 dated Mar. 18, 2015 p. 1-6.
(Continued)

*Primary Examiner* — Xuemei G Chen
(74) *Attorney, Agent, or Firm* — Anova Law Group, PLLC

(57) ABSTRACT

An image processing method includes capturing an initial image of a subject based on a preset initial exposure value, capturing a compensatory image of the subject based on a preset compensatory exposure value greater than the initial exposure value, calculating a synthesized pixel value at a pixel coordinate position based on a pixel value of an initial pixel at the pixel coordinate position in the initial image and a pixel value of a compensatory pixel at the pixel coordinate position in the compensatory image, and generating a captured image based upon the synthesized pixel value.

10 Claims, 5 Drawing Sheets

(51) Int. Cl.
*H04N 5/217* (2011.01)
*H04N 5/235* (2006.01)

(52) U.S. Cl.
CPC ......... *H04N 5/2355* (2013.01); *H04N 5/2356* (2013.01); *G06T 2207/10016* (2013.01); *G06T 2207/10024* (2013.01); *G06T 2207/10144* (2013.01); *G06T 2207/20012* (2013.01); *G06T 2207/20208* (2013.01); *G06T 2207/20221* (2013.01)

(56) References Cited

U.S. PATENT DOCUMENTS

| | | | |
|---|---|---|---|
| 7,512,349 B2* | 3/2009 | Itoh | G03G 15/5037 347/133 |
| 8,675,984 B2* | 3/2014 | Jia | H04N 5/235 348/229.1 |
| 8,885,976 B1* | 11/2014 | Kuo | H04N 5/211 382/103 |
| 8,989,484 B2* | 3/2015 | Moon | H04N 5/2355 382/162 |
| 9,344,636 B2* | 5/2016 | Tico | H04N 5/23277 |
| 9,460,492 B2* | 10/2016 | Takeru | G06T 5/002 |
| 2005/0243175 A1* | 11/2005 | Yamada | H04N 5/2354 348/207.1 |
| 2007/0025747 A1 | 2/2007 | Itoh et al. | |
| 2007/0201747 A1* | 8/2007 | Yamada | G06K 9/00228 382/199 |
| 2007/0242900 A1* | 10/2007 | Chen | G06T 5/50 382/294 |
| 2008/0063254 A1* | 3/2008 | Tanizaki | G06T 7/0004 382/141 |
| 2009/0046947 A1* | 2/2009 | Kobayashi | G06T 5/50 382/284 |
| 2009/0080791 A1* | 3/2009 | Chen | H04N 5/235 382/266 |
| 2009/0238435 A1* | 9/2009 | Shields | G01N 21/6458 382/133 |
| 2010/0157110 A1* | 6/2010 | Hatanaka | H04N 5/217 348/241 |
| 2010/0246940 A1* | 9/2010 | Lin | G06T 5/009 382/159 |
| 2011/0026849 A1* | 2/2011 | Kameyama | G06T 3/4053 382/260 |
| 2011/0211732 A1* | 9/2011 | Rapaport | G06F 3/1454 382/107 |
| 2011/0254976 A1* | 10/2011 | Garten | G06F 3/1454 348/229.1 |
| 2012/0200744 A1* | 8/2012 | Matsuoka | H04N 5/23254 348/239 |
| 2012/0274798 A1* | 11/2012 | Takahashi | H04N 9/045 348/222.1 |
| 2013/0308854 A1* | 11/2013 | Hosokawa | G06K 9/6256 382/159 |
| 2014/0029819 A1* | 1/2014 | Zeng | G06T 11/003 382/131 |
| 2014/0055638 A1* | 2/2014 | Son | H04N 5/2353 348/229.1 |
| 2014/0301642 A1* | 10/2014 | Muninder | H04N 5/23216 382/167 |
| 2015/0002704 A1* | 1/2015 | Vidal-Naquet | H04N 5/2355 348/241 |
| 2015/0049215 A1* | 2/2015 | Kuang | H04N 5/2355 348/231.6 |
| 2015/0092066 A1* | 4/2015 | Geiss | H04N 5/2258 348/180 |
| 2015/0294191 A1* | 10/2015 | Zhang | G06N 20/00 382/160 |

FOREIGN PATENT DOCUMENTS

| | | |
|---|---|---|
| CN | 101753825 A | 6/2010 |
| CN | 101841631 A | 9/2010 |
| CN | 102629976 A | 8/2012 |
| CN | 103312942 A | 9/2013 |
| JP | H07131708 A | 5/1995 |
| JP | 2004032583 A | 1/2004 |
| JP | 2011004088 A | 1/2011 |
| JP | 2011029695 A | 2/2011 |
| JP | 2013243780 A | 12/2013 |

OTHER PUBLICATIONS

Huan Gu, Double-scan Stitch Technology to Improve the Dynamic Range of Color Seperation, Printing Field, 2002, 3 pages, vol. 9, China.

* cited by examiner

METHODS AND DEVICES FOR IMPROVING IMAGE QUALITY BASED ON SYNTHESIZED PIXEL VALUES

CROSS-REFERENCE TO RELATED APPLICATION

This is a continuation application of International Application No. PCT/CN2014/079778, filed on Jun. 12, 2014, the entire contents of which are incorporated herein by reference.

TECHNICAL FIELD

The present disclosure relates to image processing and, in particular, to an image processing method, device, and camera.

BACKGROUND

The pursuit of high image quality has been a motivation in improving methods and devices for capturing digital images. The quality of a digital image is typically measured by signal-to-noise ratio (SNR). If a uniform area is being captured, the pixel values within an ideal photo of the uniform area should be identical. However, digital cameras are not ideal. Due to the noise introduced from electrical characteristics of sensors, pixel values in a captured photo may have a Gaussian-like distribution around a central value. The SNR may be used to measure a non-ideality in imaging a uniform area.

Conventional approaches for improving the SNR may comprise improving a manufacturing process of sensors in camera equipment so as to increase the image quality, which is in nature equipment upgrading. Such approach may improve image quality to a certain extent while significantly increasing cost to cameras.

SUMMARY

Embodiments of the present disclosure provide an image processing method, device, and camera that are capable of improving image quality at a low cost.

In accordance with the present disclosure, there is provided an image processing method including capturing an initial image of a subject based on a preset initial exposure value, capturing a compensatory image of the subject based on a preset compensatory exposure value greater than the initial exposure value, calculating a synthesized pixel value at a pixel coordinate position based on a pixel value of an initial pixel at the pixel coordinate position in the initial image and a pixel value of a compensatory pixel at the pixel coordinate position in the compensatory image, and generating a captured image based upon the synthesized pixel value.

In some embodiments, calculating the synthesized pixel value includes determining a weight value of the initial pixel and a weight value of the compensatory pixel, and performing a weighted averaging to calculate the synthesized pixel value based on the pixel value and the weight value of the initial pixel and the pixel value and the weight value of the compensatory pixel.

In some embodiments, determining the weight value of the initial pixel and the weight value of the compensatory pixel includes detecting the pixel value of the compensatory pixel, determining the weight value of the compensatory pixel as a value ranging from 0 to 1, and determining the weight value of the initial pixel based upon the determined weight value of the compensatory pixel.

In some embodiments, determining the weight value of the initial pixel and the weight value of the compensatory pixel includes detecting the pixel value of the compensatory pixel, determining a variable corresponding to the compensatory pixels as having a value 0 if the pixel value of the compensatory pixel is less than a preset threshold or as having a value 1 if the pixel value of the compensatory pixel is no less than the preset threshold, generating a binary image for the compensatory image based upon the determined variable, determining the weight value of the compensatory pixel according to the binary image, and determining the weight value of initial pixel based upon the determined weight value of the compensatory pixel.

In some embodiments, the method further includes performing a smooth filtering on the binary image to generate a smoothed binary image. In these embodiments, determining the weight value of the compensatory pixel according to the binary image includes determining the weight value of the compensatory pixel according to the smoothed binary image.

In some embodiments, the initial image and the compensatory image are multi-channel images each having a plurality of pixel components for each pixel. In these embodiments, calculating the synthesized pixel value includes performing a brightness value conversion based on preset conversion coefficients and pixel component values of the compensatory pixel to obtain a brightness value of the compensatory pixel, determining a weight value of the compensatory pixel based upon the determined brightness value, determining a weight value of the initial pixel according to the determined weight value of the compensatory pixel, performing a weighted averaging to obtain a synthesized pixel component value for each of the pixel components based on the weight value and the pixel component value of the pixel component of the initial pixel and the weight value and the pixel component value of the pixel component of the compensatory pixel, and determining the synthesized pixel value based upon the obtained synthesized pixel component value for each of the pixel components.

Also in accordance with the present disclosure, there is provided an image processing device including a processor and a memory storing instructions that, when executed by the processor, cause the processor to obtain an initial image of a subject captured based on a preset initial exposure value, obtain a compensatory image of the subject captured based on a preset compensatory exposure value greater than the initial exposure value, calculate a synthesized pixel value at a pixel coordinate position based on a pixel value of an initial pixel at the pixel coordinate position in the initial image and a pixel value of a compensatory pixel at the pixel coordinate position in the compensatory image, and generate a captured image based upon the synthesized pixel value.

In some embodiments, the instructions further cause the processor to determine a weight value of the initial pixel and a weight value of the compensatory pixel, and perform a weighted averaging to calculate the synthesized pixel value based on the pixel value and the weight value of the initial pixel and the pixel value and the weight value of the compensatory pixel.

In some embodiments, the instructions further cause the processor to detect the pixel value of the compensatory pixel, determine the weight value of the compensatory pixel as a value ranging from 0 to 1, and determine the weight value of the initial pixel based upon the determined weight value of the compensatory pixel.

In some embodiments, the instructions further cause the processor to detect the pixel value of the compensatory pixel, determine a variable corresponding to the compensatory pixels as having a value 0 if the pixel value of the compensatory pixel is less than a preset threshold or as having a value 1 if the pixel value of the compensatory pixel is no less than the preset threshold, generate a binary image for the compensatory image based upon the determined variable, determine the weight value of the compensatory pixel according to the binary image, and determine the weight value of initial pixel based upon the determined weight value of the compensatory pixel.

In some embodiments, the instructions further cause the processor to perform a smooth filtering on the binary image to generate a smoothed binary image, and determine the weight value of the compensatory pixel according to the smoothed binary image.

In some embodiments, the initial image and the compensatory image are multi-channel images each having a plurality of pixel components for each pixel. In these embodiments, the instructions further cause the processor to perform a brightness value conversion based on preset conversion coefficients and pixel component values of the compensatory pixel to obtain a brightness value of the compensatory pixel, determine a weight value of the compensatory pixel based upon the determined brightness value, determine a weight value of the initial pixel according to the determined weight value of the compensatory pixel, perform a weighted averaging to obtain a synthesized pixel component value for each of the pixel components based on the weight value and the pixel component value of the pixel component of the initial pixel and the weight value and the pixel component value of the pixel component of the compensatory pixel, and determine the synthesized pixel value based upon the obtained synthesized pixel component value for each of the pixel components Also in accordance with the present disclosure, there is provided a camera including an image capturing device configured to capture images and a processor coupled to the image capturing device and configured to control the image capturing device to capture an initial image of a subject based on a preset initial exposure value, control the image capturing device to capture a compensatory image of the subject based on a preset compensatory exposure values greater than the initial exposure value, calculate a synthesized pixel value at a pixel coordinate position based on a pixel value of an initial pixel at the pixel coordinate position in the initial image and a pixel value of a compensatory pixel at the pixel coordinate position in the compensatory image, and generate a captured image based upon the synthesized pixel value.

With the embodiments of the present disclosure, an image captured with an initial exposure value may be compensated on a pixel to pixel basis by synthesizing with one or more images captured with one or more higher exposure values, such that the SNR of the processed image can be effectively increased and the visibility of detail in, e.g., dark regions of the image can be improved at low costs without the need for equipment upgrading.

DETAILED DESCRIPTION OF EMBODIMENTS

The technical solutions of the present disclosure will be described with reference to the following embodiments in conjunction with the drawings. The described embodiments are merely illustrative embodiments of the present disclosure. Other embodiments will be apparent to those skilled in the art without departing from the disclosure.

Figure 1:
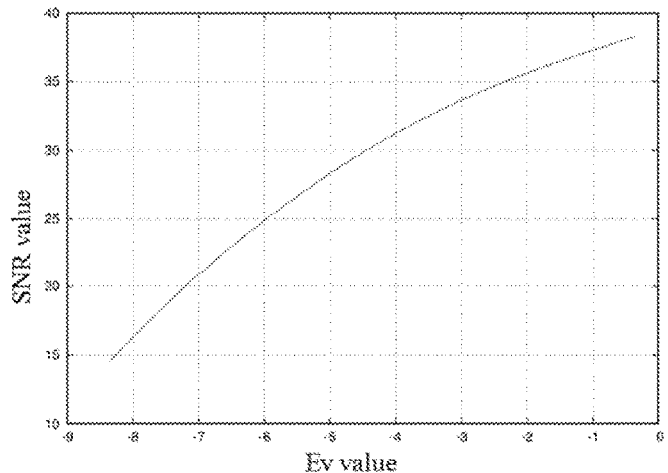
FIG. 1 is a diagram showing a signal-to-noise ratio (SNR) against an exposure value, in accordance with an embodiments of the present disclosure.

In some embodiments of the present disclosure, an image captured with an initial exposure value may be compensated on a pixel to pixel basis by synthesizing with one or more images captured with higher exposure values. As shown in FIG. 1, an image having a higher exposure value Ev may have a higher signal-to-noise ratio (SNR). Therefore, the SNR of an image can be effectively increased by fusing an image having a normal exposure value and an image having a higher exposure value. In FIG. 1, the horizontal axis represents the exposure value Ev, and the vertical axis represents the signal-to-noise ratio SNR.

Figure 2:
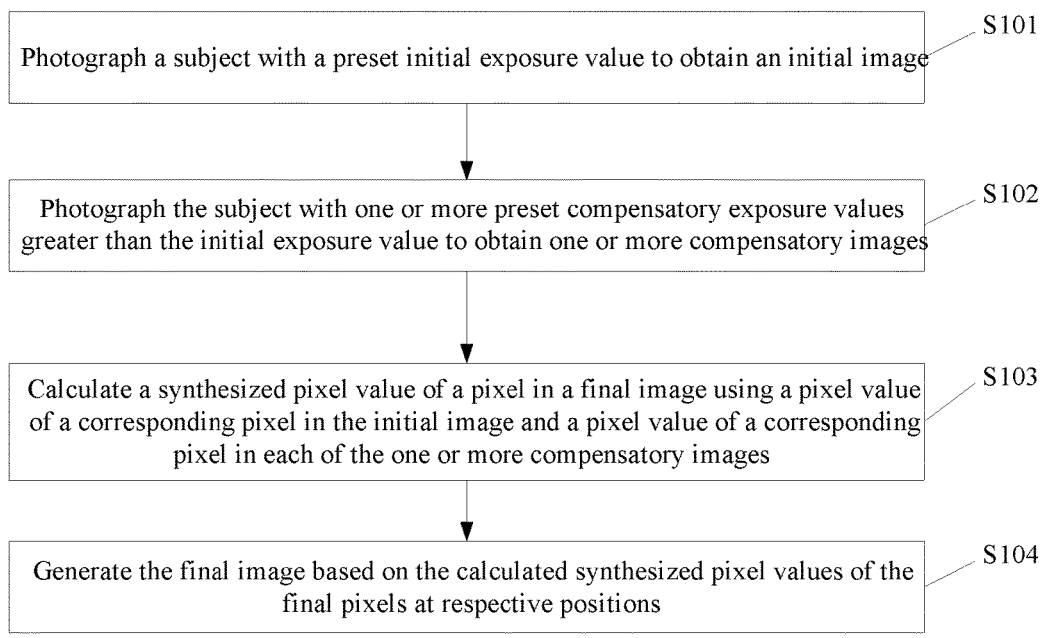
FIG. 2 is a flowchart of an image processing method, in accordance with an embodiments of the present disclosure.

FIG. 2 is a flowchart of an image processing method, in accordance with an embodiment of the present disclosure. The method can be implemented in various types of cameras. As shown in FIG. 2, at S101, a subject is photographed with a preset initial exposure value to obtain an initial image.

An exposure value is a parameter that represents the degree of exposure. The exposure value can be collectively determined by, for example, a shutter speed (an exposure interval), an aperture value, and a sensitivity (i.e., ISO value), set in a camera. A brighter image can be obtained with a greater exposure value. The initial exposure value can be an exposure value manually set by a user based on current ambient light. Alternatively, the initial exposure value can be a default exposure value set in the camera. When the user photographs the subject, the initial image of the subject can be captured based on the initial exposure value.

At S102, the subject is photographed with one or more preset compensatory exposure values that are greater than the initial exposure value to obtain one or more compensatory images corresponding to the one or more compensatory exposure values.

In some embodiments, one compensatory image can be captured for each of the one or more compensatory exposure values. Each of the one or more compensatory exposure values can be greater than the initial exposure value, such that one or more compensatory images that are brighter than the initial image can be obtained. An exposure value greater than a normal exposure value is also referred to as an "overexposure value." An image captured with an overexposure value is also referred to as an "overexposed image." The one or more compensatory images can include a plurality of overexposed images.

The process of capturing the one or more compensatory images described above and processes described below in S103-S104 can be performed in a short period of time after the process of S101 to obtain a final image.

At S103, a synthesized pixel value of a pixel in the final image is calculated using a pixel value of a corresponding pixel in the initial image and a pixel value of a corresponding pixel in each of the one or more compensatory images. In the present disclosure, a pixel in the initial image is also referred to as an "initial pixel," a pixel in a compensatory image is also referred to as a "compensatory pixel," and a pixel in the final image is also referred to as a "final pixel."

In some embodiments, the synthesized pixel value of a pixel can be calculated by averaging the pixel values of pixels that have a same pixel coordinate position in the initial image and each of the one or more compensatory images.

In some embodiments, weight values can be assigned to pixels in the one or more compensatory images based on the pixel values of the pixels in the one or more compensatory images. Further, weight values can also be assigned to pixels in the initial image. In these embodiments, the synthesized pixel value of a pixel at a pixel coordinate position can be calculated as a weighted average of the pixels values using the determined weight values. In some embodiments, the pixels in the one or more compensatory images, which may be overexposed images, can be classified. For example, for a compensatory pixel, a high weight value can be assigned if the compensatory pixel is a normally exposed pixel and a low weight value or a zero weight value can be assigned if the compensatory pixel is an overexposed pixel. An image having a better SNR can be obtained by weighted averaging pixels having the same pixel coordinate position in the initial image and each of the one or more compensatory images.

At S104, the final image is generated based on the calculated synthesized pixel values of the final pixels at respective positions.

That is, a complete image, i.e., the final image, can be generated as a captured image from the calculated synthesized pixel values of the final pixels at respective pixel coordinate positions.

It should be noted that images, e.g., the initial image and the one or more compensatory images, processed according to the above-described exemplary method are brightness images, i.e., grayscale images. In some embodiments, one or more of the initial image and the one or more compensatory images can be multi-channel images such as RGB images. In these embodiments, RGB components in the one or more multi-channel images can be converted into brightness values according to conversion coefficients stipulated in ITU-709, and then the method discussed above can be performed.

In some embodiments of the present disclosure, an image captured with an initial exposure value may be compensated on a pixel to pixel basis by synthesizing with one or more images captured with one or more higher exposure values, such that the SNR of a final image can be effectively increased and the visibility of detail in a dark region of the final image can be improved at low costs without the need for equipment upgrading.

Figure 3:
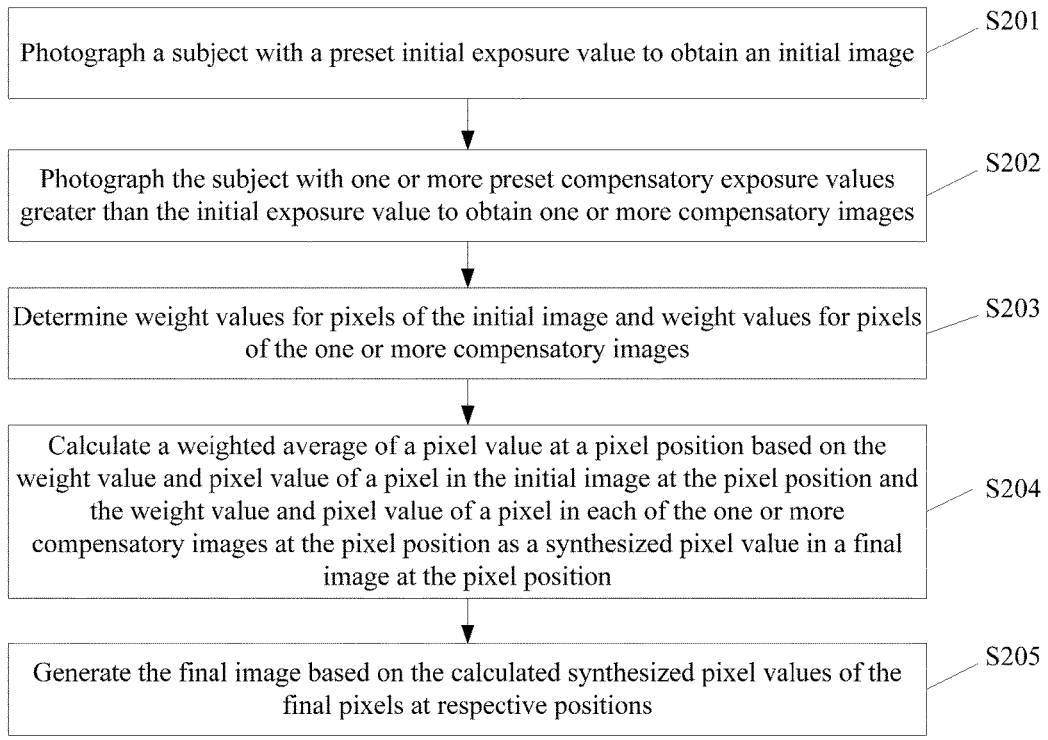
FIG. 3 is a flowchart of another image processing method, in accordance with an embodiments of the present disclosure.

FIG. 3 is a flowchart of another image processing method, in accordance with an embodiments of the present disclosure. The method can be implemented in various types of cameras. As shown in FIG. 3, at S201, in the process of photographing a subject, the subject is photographed using a preset initial exposure value to obtain an initial image.

An exposure value is a parameter that represents the degree of exposure. The exposure value can be collectively determined by, for example, a shutter speed (an exposure interval), an aperture value, and a sensitivity (i.e., ISO value), set in a camera. A brighter image can be obtained with a greater exposure value. The initial exposure value can be an exposure value manually set by a user based on current ambient light. Alternatively, the initial exposure value can be a default exposure value set in the camera. When the user photographs the subject, the initial image of the subject can be captured based on the initial exposure value.

At S202, the subject is photographed using one or more preset compensatory exposure values that are greater than the initial exposure value to obtain one or more compensatory images corresponding to the one or more compensatory exposure values.

In some embodiments, a compensatory image can be captured for each of the one or more compensatory exposure values. Each of the one or more compensatory exposure values can be greater than the initial exposure value, such that one or more images that are brighter than the initial image can be obtained. The one or more compensatory images can include a plurality of overexposed images captured based on the one or more compensatory exposure values, e.g., one or more overexposure values.

At S203, weight values for pixels of the initial image and weight values for pixels of the one or more compensatory images are determined.

At S204, for each pixel position, a weighted average of a pixel value of a pixel at that pixel position in the initial image and a pixel value of a corresponding compensatory pixel at that pixel position in each of the one or more compensatory images is calculated considering the weight values of the pixels at that pixel position in the initial image and the one or more compensatory images, to calculate a synthesized pixel value of a corresponding pixel at that pixel position in the final image.

In some embodiments, a sum of the weight values for corresponding pixels at a same pixel coordinate position in the initial image and the one or more compensatory images is 1. Therefore, the weight value for a pixel of the initial image can be calculated when the weight value for the corresponding compensatory pixel in each of the one or more compensatory images is determined, where the weight value for a compensatory pixel in a compensatory image can be calculated based on the pixel value of this pixel.

For example, assume K compensatory images are captured. One approach for calculating the synthesized pixel value of a final pixel can include first calculating a weighted average of the pixel value of a corresponding initial pixel and the pixel value of a corresponding compensatory pixel for each of the K compensatory images to obtain K weighted averages, and then calculating an average of the K weighted averages as the synthesized pixel value of the final pixel. This approach is described in more detail below.

First, a preliminary weight value of a compensatory pixel at a pixel coordinate position in a k-th compensatory image of the K compensatory images is determined. Specifically, a variable $\omega_k$ can be determined based on the pixel value of this compensatory pixel, wherein $\omega_k \in [0,1]$. For example, a larger value can be assigned to the variable $\omega_k$ for a compensatory pixel having a greater pixel value. After determining the variable $\omega_k$, the preliminary weight value of the compensatory pixel at the pixel coordinate position in the k-th compensatory image can be determined as $1-\omega_k$, and the preliminary weight value of the corresponding initial pixel at the pixel coordinate position in the initial image can be determined as $1-(1-\omega_k)$, i.e., $\omega_k$.

Based on the above determined weight values, the synthesized pixel value of the final pixel at the pixel coordinate position can be calculated using the following equation:

$$\overline{p} = \frac{1}{K} \sum_{k=1}^{K} (\omega_k P_0 + (1 - \omega_k) P_k) \quad (1)$$

wherein $P_0$ is the pixel value of the initial pixel at the pixel coordinate position in the initial image, $P_k$ is the pixel value of the compensatory pixel at the same pixel coordinate position in the k-th compensatory image, and p is the weighted average of the pixel values of all pixels at the same corresponding pixel coordinate position in the initial image and the one or more compensatory images. As can be seen from Equation (1), an overall weight value, i.e., the "weight value" referred to above in, e.g., S203, of the compensatory pixel in the k-th compensatory image as in the final weighted averaging calculation (e.g., Equation (1)) is $$\frac{1 - \omega_k}{K},$$

and the overall weight value of the corresponding initial pixel as in the final weighted averaging calculation is $$\frac{1}{K} \sum_{k=1}^{K} \omega_k.$$

When k=1, the problem reduces to the situation where only one compensatory image is captured, in which the preliminary weight value and the overall weight value of a pixel are identical. In the present disclosure, unless otherwise specified, the term "weight value" alone refers to the overall weight value.

At S205, the final image is generated based on the calculated synthesized pixel values of the final pixels at respective positions.

That is, a complete image, i.e., the final image, can be generated as a captured image from the calculated synthesized pixel values of the final pixels at respective pixel coordinate positions.

Figure 4:
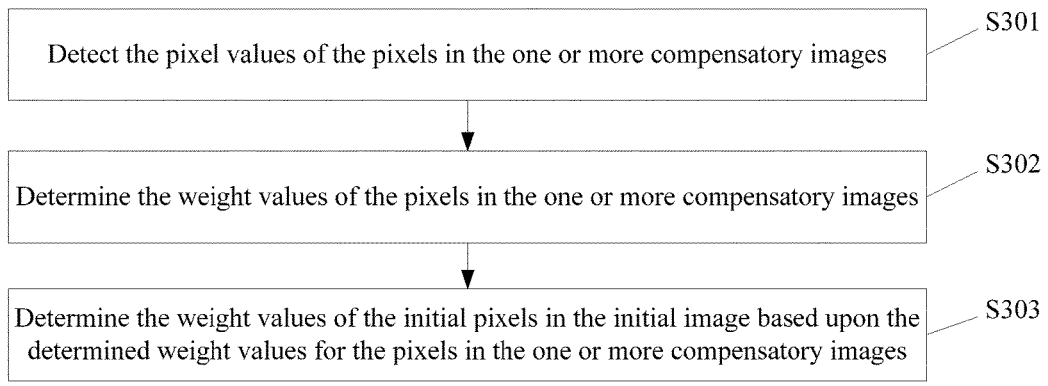
FIG. 4 is a flowchart of a method for determining weight values, in accordance with an embodiments of the present disclosure.

The process of determining weight values in S203 can be performed by a method illustrated in FIG. 4. FIG. 4 is a flowchart of a method for determining weight values, in accordance with an embodiments of the present disclosure. As shown in FIG. 4, at S301, the pixel values of the compensatory pixels in the one or more compensatory images are detected.

In some embodiments of the present disclosure, the pixel value of a pixel can be represented by a brightness value ranging from 0 to 255. According to the disclosure, each of the one or more compensatory images can be an overexposed image captured based on a compensatory exposure value corresponding to an overexposure value. Such an overexposed image can include both overexposed pixels and pixels having a large exposure value but not being overexposed.

At S302, the weight values of the compensatory pixels in the one or more compensatory images are determined, where each of the weight values is in a range from 0 to 1 (both inclusive).

In some embodiments, a weight value for a brightness value can be determined by training using a training set including a plurality of images. A mapping table of brightness values and corresponding weight values can be generated, such that a weight value corresponding to a brightness value in a compensatory image can be determined by searching the mapping table. In some embodiments, a variable for a compensatory pixel can be first determined, and then a weight value of the compensatory pixel in a compensatory image can be determined according to the variable. This approach of determining the weight value is simple and accurate with relatively small processing overhead.

At S303, the weight values of the initial pixels in the initial image are determined based upon the determined weight values for the compensatory pixels in the one or more compensatory images.

In some embodiments of the present disclosure, in the process of determining the weight value of a compensatory pixel at a corresponding pixel coordinate position in the k-th compensatory image, a variable $\omega_k$ can be first determined based upon the pixel value of this compensatory pixel, wherein $\omega_k \in [0,1]$ and $\omega_k$ is larger for a compensatory pixel having a greater pixel value. After determining the variable $\omega_k$, the preliminary weight value of the compensatory pixel at the pixel coordinate position in the k-th compensatory image is calculated as $1-\omega_k$, and the preliminary weight value of the initial pixel at the same pixel coordinate position in the initial image is $\omega_k$. Correspondingly, the overall weight value of the compensatory pixel in the k-th compensatory image and that of the corresponding initial pixel at the pixel coordinate position are $$\frac{1 - \omega_k}{K} \text{ and } \frac{1}{K} \sum_{k=1}^{K} \omega_k,$$

respectively.

Figure 5:
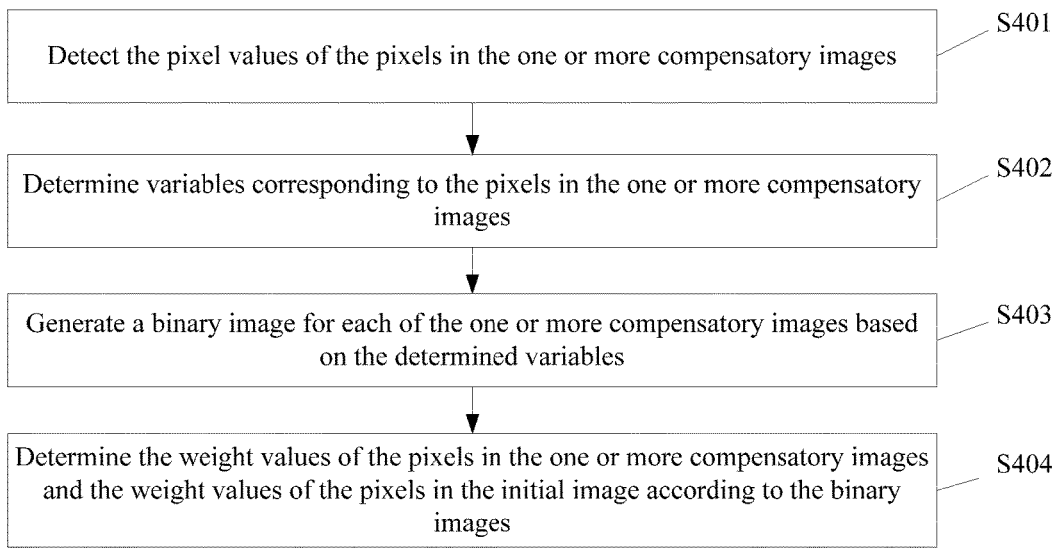
FIG. 5 is a flowchart of another method for determining weight values, in accordance with an embodiments of the present disclosure.

FIG. 5 shows a flowchart of a method of determining the weight values in S203 according to another embodiment of the disclosure. As shown in FIG. 5, at S401, the pixel values of the compensatory pixels in the one or more compensatory images are detected.

In some embodiments of present disclosure, the pixel value of the pixel can be represented as a brightness value ranging from 0 to 255.

At S402, variables corresponding to the compensatory pixels in the one or more compensatory images are determined. Specifically, for a compensatory pixel having a pixel value smaller than a preset threshold, the corresponding variable is determined as having a value 0. On the other hand, for a compensatory pixel having a pixel value equal to or greater than the preset threshold, the corresponding variable is determined as having a value 1.

At S403, a binary image is generated for each of the one or more compensatory images based on the determined variable values. In some embodiments, a smooth filtering is performed on the generated one or more binary images.

At S404, the weight values of the compensatory pixels in the one or more compensatory images and the weight values of the initial pixels in the initial image are determined according to the variable values of points in the binary images.

In some embodiments of present disclosure, a classification of pixels can be performed based on the pixel values of the compensatory pixels in the one or more compensatory images. For instance, for a compensatory pixel having a pixel value of $p_{k+1}$ in the k-th compensatory image, the value of the corresponding variable $\omega_k$ can be determined by:

$$\omega_k = \begin{cases} 0, & p_k < T \\ 1, & p_k \geq T \end{cases} \quad (2)$$

wherein T is a threshold for determining whether a pixel is saturated. The threshold T can have a value ranging from 230 to 255. A binary image $W_k$ corresponding to the k-th compensatory image can be obtained from Equation (2), in which the value $\omega_k$ of each pixel is 1 or 0, indicating whether the corresponding compensatory pixel in the compensatory image is overexposed or not. A smooth filtering, such as a Gaussian filtering, may be performed to the binary image $W_k$ to prevent a significant change around those saturated pixels in the image.

In the filtered binary image $W_k$, the value of variable $\omega_k$ of each pixel is within a range from 0 to 1, both inclusive. It is noted that in the filtered binary image, the value of a variable is not necessarily 0 or 1 due to the smooth filtering. The preliminary weight value of the corresponding compensatory pixel in the compensatory image corresponding to the filtered binary image is $1-\omega_k$, and the preliminary weight value of the corresponding initial pixel in the initial image is $\omega_k$. The overall weight values of the corresponding compensatory pixel and the initial pixel are $$\frac{1-\omega_k}{K} \text{ and } \frac{1}{K}\sum_{k=1}^{K}\omega_k,$$

respectively.

Figure 6:
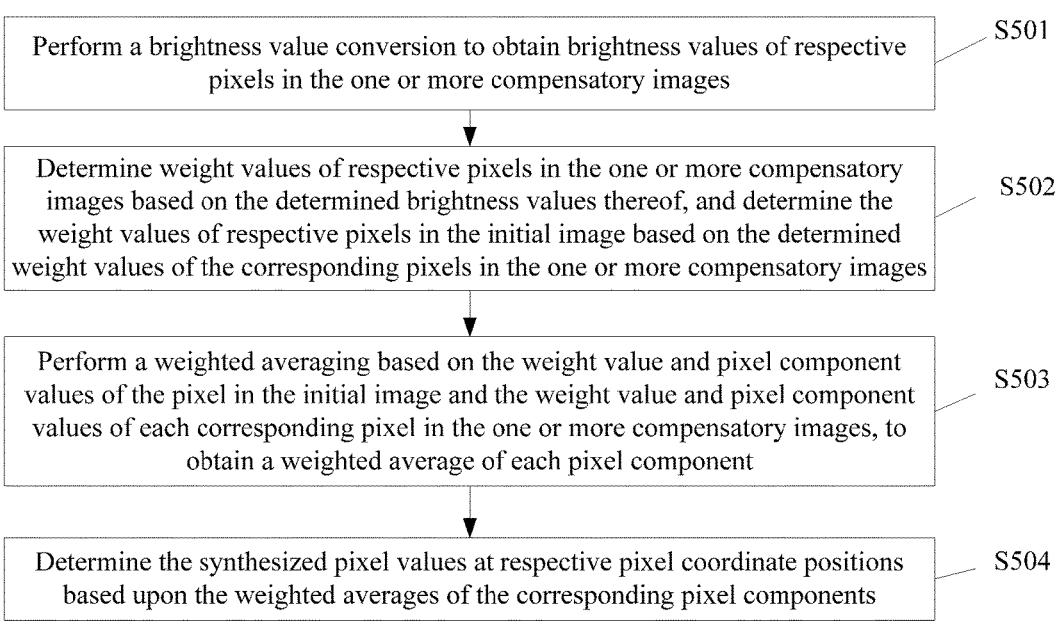
FIG. 6 is a flowchart of a method for determining a synthesized pixel value of a multi-channel image, according to embodiments of the present disclosure.

FIG. 6 is a flowchart of a method for determining synthesized pixel values of a multi-channel image, according to the embodiments of the present disclosure. In these embodiments, each of the initial image and the one or more compensatory images can be a triple-channel image, such as an RGB image. As shown in FIG. 6, at S501, if the one or more compensatory images are one or more multi-channel images having multiple channels, a brightness value conversion is performed based on (1) preset conversion coefficients and (2) pixel component values of respective compensatory pixels in the one or more compensatory images, to obtain brightness values of respective compensatory pixels. For each compensatory pixel, a pixel component value corresponds to one of the multiple channels.

At S502, weight values of respective compensatory pixels in the one or more compensatory images are determined based on the determined brightness values of the respective compensatory pixels, and the weight values of respective initial pixels in the initial image are determined based on the determined weight values of the corresponding compensatory pixels.

A multi-channel image may be, for example, an RGB image. An RGB image can produce various colors by changing and adding the three color channels of three pixel components, i.e., red (R), green (G), and blue (B), in various manners. The conversion coefficients can be the conversion coefficients as stipulated by ITU-709. Brightness values of respective pixels can be calculated from the corresponding RGB components, and then the weight values of the respective pixels can be calculated using the method described above with reference to FIG. 4 or FIG. 5. For example, an equation for calculating a brightness value Y from the RGB components can be: Y=0.30*R+0.59*G+0.11*B.

At S503, a weighted averaging is performed based on (1) the weight value and the pixel component values of an initial pixel at a pixel coordinate position in the initial image, and (2) the weight value and the pixel component values of each corresponding compensatory pixel in the one or more compensatory images, to obtain a weighted average of each pixel component at the pixel coordinate position for the final image.

That is, the weighted average of R, the weighted average of G, and the weighted average of B at a pixel coordinate position can be calculated from the RGB components of the pixels (including the initial pixels and one or more compensatory pixels) at the pixel coordinate position and the determined weight values of the pixels at the pixel coordinate position.

At S504, synthesized pixel values at respective pixel coordinate positions are determined based upon the weighted averages.

The synthesized pixel value of each compensated pixel can be obtained by combining the weighted averages of the corresponding channel components. For example, for a pixel, if the weighted averages of R, G, and B are 124, 205, and 124, respectively, a synthesized pixel value is #7CCD7C (hexadecimal). Once the synthesized pixel value is determined, an SNR of the initial image can be increased based upon the synthesized pixel value.

Figure 7:
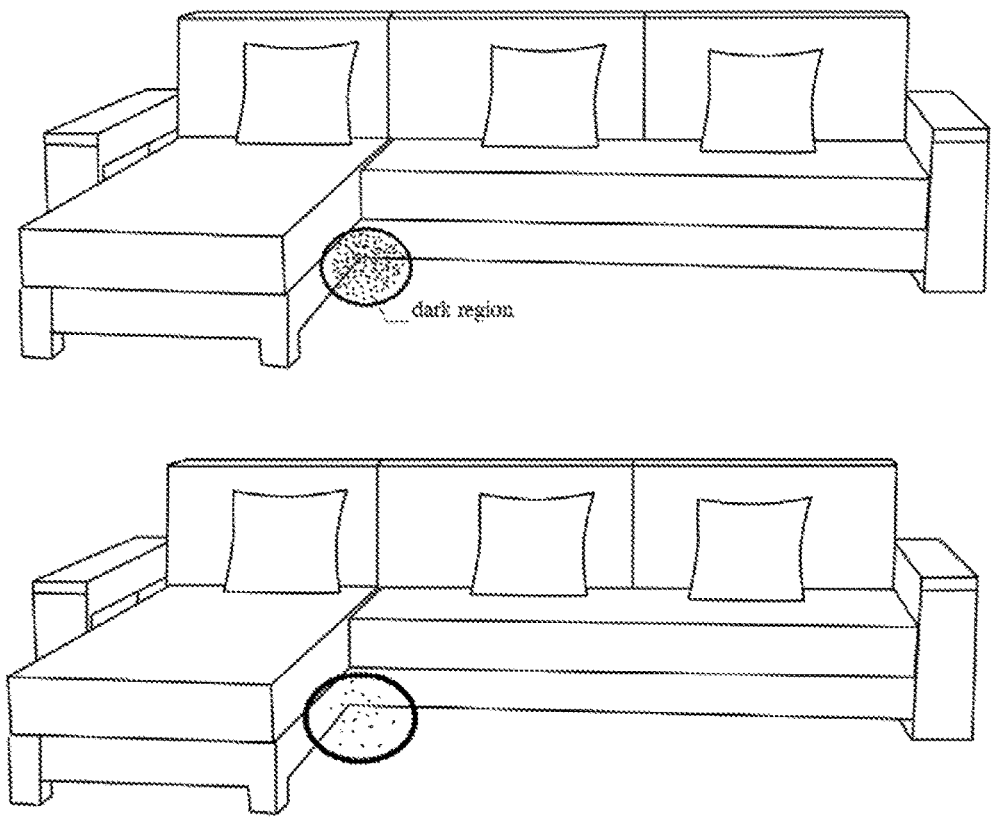
FIG. 7 is a view showing a comparison of images with and without the processing in accordance with embodiments of the present disclosure.

FIG. 7 is a view showing a comparison of images, in accordance with an embodiment of the present disclosure. The image in the upper panel of FIG. 7 is captured with a normal exposure value of a scene with dimmed environmental light, in which a certain region, as indicated by the circle, is dark and contains less discernable details due to insufficient illumination. The lower panel of FIG. 7 shows an image obtained according to the present disclosure by processing the image in the upper panel of FIG. 7 using one or more images captured under one or more higher exposure values (overexposure). As shown in FIG. 7, in the processed image, the visibility of details in the dark region is improved, and the SNR of the dark region is increased. A quality of the entire image is improved and a greater dynamic range is obtained.

In some embodiments of the present disclosure, an image captured under an initial exposure value may be compensated on a pixel to pixel basis by weighted averaging with one or more images captured under one or more higher exposure values. The SNR of the processed image can be effectively increased, and a visibility of details in, e.g., dark regions can be improved at low a cost, without the need for equipment upgrade.

An image processing device and a camera according to embodiments of the present disclosure will be described in detail below.

Figure 8:
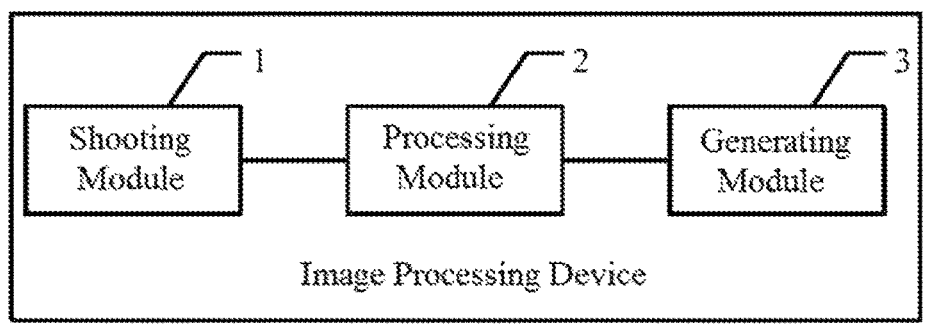
FIG. 8 is a schematic view of an image processing device, in accordance with an embodiments of the present disclosure.

FIG. 8 is a schematic view of an image processing device, in accordance with an embodiments of the present disclosure. The image processing device shown in FIG. 8 can be provided in various types of cameras and includes a capturing module 1, a processing module 2, and a generating module 3.

The capturing module 1 can be configured to photograph a subject with a preset initial exposure value to obtain an initial image and photograph the subject with one or more preset compensatory exposure values that are greater than the initial exposure value to obtain one or more compensatory images.

The processing module 2 can be configured to perform a calculation using pixel values of initial pixels at respective positions in the initial image and pixel values of compensatory pixels at corresponding positions in the one or more compensatory images to obtain synthesized pixel values of final pixels at the respective positions in a final image.

The generating module 3 can be configured to generate a captured image, i.e., the final image, based upon the synthesized pixel values of the final pixels at the respective positions.

The initial exposure value and the one or more compensatory exposure values can be pre-stored in a memory. The capturing module 1 can capture the initial image and the compensatory images with the exposure values stored in the memory. An exposure value is a parameter that represents the degree of exposure, and can be collectively determined by a shutter speed (an exposure interval), an aperture value, and a sensitivity (i.e., ISO value), set in a camera. A brighter image can be obtained with a greater exposure value.

The initial exposure value can be an exposure value manually set by a user based on current ambient light. Alternatively, the initial exposure value can be a default exposure value set in the camera. When the user photographs the subject, the initial image of the subject can be captured based on the initial exposure value.

In some embodiments, one compensatory image can be captured for each of the one or more compensatory exposure values. Each of the one or more compensatory exposure values can be greater than the initial exposure value, such that one or more compensatory images that are brighter than the initial image can be obtained. The one or more compensatory images can include a plurality of overexposed images captured based on the one or more compensatory exposure values corresponding to overexposure values. It should be noted that in the overexposed images, there may have overexposed pixels and pixels with large exposure but not overexposed.

In some embodiments, the processing module 2 calculates the synthesized pixel value by averaging the pixel values of pixels that have a same pixel coordinate position in the initial image and each of the one or more compensatory images.

In some embodiments, the processing module 2 calculates the synthesized pixel value by determining weight values for pixels in the one or more compensatory images and pixels in the initial image based on the pixel values of the compensatory pixels, and performing a weighted average based on the determined weight values to obtain a synthesized pixel value of a pixel at a pixel coordinate position. According to actual requirements on image quality, the pixels in the one or more compensatory images, which may be overexposed images, can be classified. For example, a high weight value can be assigned to a normally exposed compensatory pixel, and a low weight value or a zero weight value can be assigned to an overexposed compensatory pixel. An image having a better SNR can be obtained by weighted averaging pixels having the same pixel coordinate position in the initial image and each of the one or more compensatory images.

The generating module 3 can generate a complete image as a captured image from the calculated synthesized pixel values of the final pixels at respective pixel coordinate positions as calculated by the processing module 2.

Figure 9:
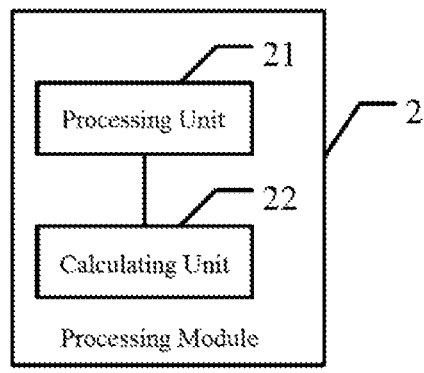
FIG. 9 is a schematic view showing a configuration of the processing module in FIG. 8, in accordance with an embodiment of the present disclosure.

FIG. 9 is a schematic view showing a configuration of the processing module 2 in FIG. 8, in accordance with an embodiment of the present disclosure. The processing module 2 shown in FIG. 9 includes a processing unit 21 and a calculating unit 22.

The processing unit 21 can be configured to determine a weight value for each pixel of the initial image and a weight value for each pixel of the one or more compensatory images.

The calculating unit 22 can be configured to perform a weighted averaging based on (1) a pixel value of an initial pixel at each position in the initial image and the weight value thereof, and (2) a pixel value of a compensatory pixel at a corresponding position in each of the one or more compensatory images and the weight value thereof, to calculate a synthesized pixel value of the final pixel at the corresponding position in the final image.

In some embodiments, the processing unit 21 is configured to detect the pixel values of respective compensatory pixels in the one or more compensatory images, determine weight values of the respective compensatory pixels in the one or more compensatory images each as a value ranging from 0 to 1, and determine weight values of respective initial pixels in the initial image based upon the determined weight values for the compensatory pixels in the one or more compensatory images.

In some embodiments, the processing unit 21 is configured to (1) detect pixel values of respective compensatory pixels in the one or more compensatory images; (2) determine a variable corresponding to a compensatory pixel having a pixel value no less than a preset threshold as having a value 1, and determine the variable corresponding to a compensatory pixel having a pixel value less than the preset threshold as having a value 0; (3) generate a binary image for each of the one or more compensatory images based upon the determined variables, perform smooth filtering on the generated one or more binary images; and (4) determine the weight values of respective compensatory pixels in each of the one or more compensatory images according to the values of variables in a corresponding smooth filtered binary images, and determine the weight values of respective initial pixels in the initial image.

In some embodiments, the processing unit 21 is configured to determine, if the one or more compensatory images are one or more multi-channel images, the weight values of respective compensatory pixels based upon component values of the compensatory pixels corresponding to the channels of the one or more compensatory images and corresponding thresholds, and determine the weight values of respective initial pixels in the initial image based upon the weight values of corresponding compensatory pixels in the one or more compensatory images.

The processing unit 21 can determine the weight values as described hereinabove. The specific process is described hereinabove in the embodiments of the present disclosure.

Figure 10:
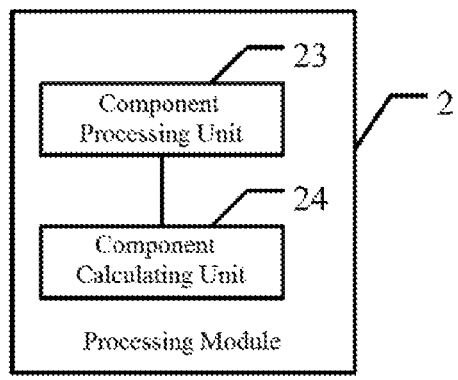
FIG. 10 is a schematic view showing another configuration of the processing module in FIG. 8, in accordance with an embodiment of the present disclosure.

It should be noted that the processing unit 21 and the calculating unit 22 can perform calculation on brightness images (i.e., grayscale images). If the initial image and the one or more compensatory images are multi-channel images such as RGB images, the processing module 2 can perform the above discussed process after corresponding RGB components are converted to brightness values according to conversion coefficients stipulated in ITU-709. FIG. 10 is a schematic view showing another configuration of the processing module 2 in FIG. 8, in accordance with an embodiment of the present disclosure. The processing module 2 shown in FIG. 10 according to the embodiments of the present disclosure includes a component processing unit 23 and a component calculating unit 24.

The component processing unit 23 can be configured to perform, if the one or more compensatory images are one or more multi-channel images each including a plurality of pixel component values, a brightness value conversion based on (1) preset conversion coefficients and (2) pixel component values of each compensatory pixel in the compensatory images, to obtain a brightness value of each compensatory pixel.

The component calculating unit 24 can be configured to (1) determine the weight values of respective compensatory pixels in the one or more compensatory images based on the determined brightness values of the respective compensatory pixels, and determine the weight values of respective initial pixels in the initial image based on the determined weight values of the corresponding compensatory pixels; (2) perform a weighted averaging based on (a) the weight value and the pixel component values of each initial pixel in the initial image, and (b) the weight value and the pixel component values of each corresponding compensatory pixel in the one or more compensatory images, to obtain a synthesized value of each pixel component of each corresponding final pixel; and (3) determine the synthesized pixel value of each final pixel based upon the obtained synthesized values of the pixel components.

In some embodiments, the processing module 2 can include the processing unit 21, the calculating unit 22, the component processing unit 23, and the component calculating unit 24 as discussed hereinabove, so as to process different types of images. Each of the units can be implemented with reference to FIG. 2 to FIG. 6.

In some embodiments of the present disclosure, an image captured under an initial exposure value may be compensated on a pixel to pixel basis by weighted averaging with one or more images captured under one or more higher exposure values. The SNR of the processed image can be effectively increased, and a visibility of details in, e.g., dark regions can be improved at a low cost, without the need for equipment upgrading.

Furthermore, the above discussed methods of assigning weight values for the compensatory images, such as the methods based on the mapping table of weight values and pixel values, are simple and accurate with a relatively small processing overhead. The methods of determining weight values by performing smooth filtering on binary images may obtain an image having higher SNR while effectively preventing a significant change around the saturated pixels in a compensatory image.

Figure 11:
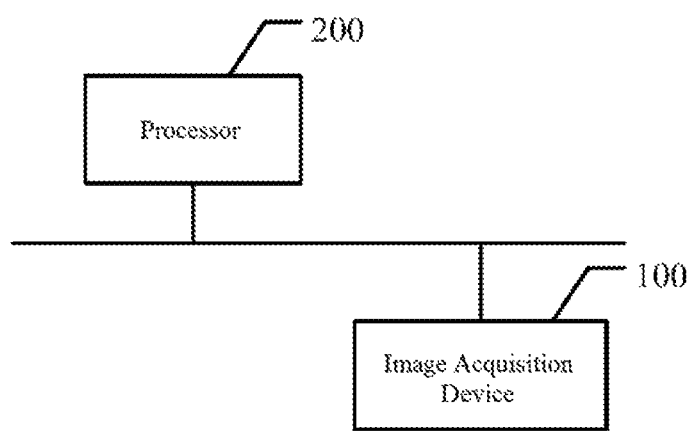
FIG. 11 is a schematic view showing a structure of a camera, in accordance with an embodiment of the present disclosure.

FIG. 11 is a schematic view showing a structure of a camera, in accordance with an embodiment of the present disclosure. The camera shown in FIG. 11 includes an image capturing device 100 and a processor 200.

The image capturing device 100 can be configured to capture images of a subject under a control of the processor 200.

The processor 200 can be configured to (1) control the image capturing device 100 to photograph the subject with a preset initial exposure value to obtain an initial image; (2) control the image capturing device 100 to photograph the subject with one or more preset compensatory exposure values that are greater than the initial exposure value to obtain one or more compensatory images; (3) calculate a synthesized pixel value of each pixel in a final image from a pixel value of a corresponding initial pixel in the initial image and a pixel value of a corresponding pixel in each of the one or more compensatory images; and (4) generate a captured image, i.e., the final image, based upon the synthesized pixel value of each final pixel.

The initial exposure value and the compensatory exposure values can be pre-stored in a memory. The processor 200 can capture the initial image and the one or more compensatory images with the exposure values stored in the memory. An exposure value is a parameter that represents the degree of exposure, and can be collectively determined by a shutter speed (an exposure interval), an aperture value, and a sensitivity (i.e., ISO value), set in the camera. A brighter image can be obtained with a greater exposure value.

The initial exposure value can be an exposure value manually set by a user based on the current ambient light. Alternatively, the initial exposure value can be a default exposure value set in the camera. When the user photographs a subject, the initial image of the subject can be captured based on the initial exposure value.

The processor 200 can instruct the image capturing device 100 to capture one compensatory image based upon each one of the one or more compensatory exposure values. Each of the one or more compensatory exposure values can be greater than the initial exposure value, such that one or more images that are brighter than the initial image can be obtained. The one or more compensatory images can include a plurality of overexposed images captured based on the one or more compensatory exposure values, e.g., one or more overexposure values. It should be noted that an overexposed image may include overexposed pixels and pixels with large exposure but not overexposed.

In some embodiments, the processor 200 calculates the synthesized pixel value by averaging the pixel values of pixels that have the same pixel coordinate position in the initial image and each of the one or more compensatory images.

Alternatively, the processor 200 calculates the synthesized pixel value by determining weight values for compensatory pixels in the one or more compensatory images and initial pixels in the initial image based on the pixel values of the compensatory pixels, and performing a weighted averaging based on the determined weight values to obtain a synthesized pixel value of a final pixel at a pixel coordinate position. According to actual requirements on image quality, the compensatory pixels in the one or more compensatory images, i.e., one or more overexposed images, can be classified. For example, a high weight value can be assigned to a normally exposed compensatory pixel, and a low weight value or a zero weight value can be assigned to an overexposed compensatory pixel. An image having a better SNR can be obtained by weighted averaging pixels that have the same pixel coordinate positions in the initial image and each of the one or more compensatory images.

The processor 200 can generate a complete image, i.e., the final image, as a captured image from the calculated synthesized pixel value of each of the final pixels at respective pixel coordinate positions.

It should be noted that the above exemplary method is performed on brightness images, i.e., grayscale images. If the initial image and the one or more compensatory images are multi-channel images such as RGB images, the processor 200 can perform the above described process after corresponding RGB components are converted to brightness values according to conversion coefficients stipulated in ITU-709.

In some embodiments, when calculating a synthesized pixel value of each final pixel in the final image from a pixel value of the corresponding pixel at a corresponding position in the initial image and a pixel value of the corresponding compensatory pixel at a corresponding position in each of the one or more compensatory images, the processor 200 (1) determines a weight value for the corresponding initial pixel of the initial image and a weight value for the corresponding compensatory pixel of each of the one or more compensatory images, and (2) performs a weighted averaging based on (a) the pixel value of the corresponding initial pixel in the initial image and the weight value thereof, and (b) the pixel value of the corresponding compensatory pixel in each of the one or more compensatory images and the weight value thereof, to calculate the synthesized pixel value of the final pixel.

In some embodiments, when determining a weight value for an initial pixel of the initial image and a weight value for a corresponding compensatory pixel of each of the one or more compensatory images, the processor 200 (1) detects a pixel value of the compensatory pixel in each of the one or more compensatory images; (2) determines the weight value of the compensatory pixel in each of the one or more compensatory images as a value ranging from 0 to 1; and (3) determines the weight value of the initial pixel in the initial image based upon the determined weight value for the compensatory pixel in each of the one or more compensatory images.

In some embodiments, when determining the weight value for each initial pixel of the initial image and the weight value for the corresponding compensatory pixel of each of the one or more compensatory images, the processor 200 (1) detects pixel values of respective compensatory pixels in the one or more compensatory images; (2) determines a variable corresponding to a compensatory pixel having a pixel value no less than a preset threshold as having a value 1, and determine the variable corresponding to a compensatory pixel having a pixel value less than the preset threshold as having a value 0; (3) generates a binary image for each of the one or more compensatory images based upon the determined variables, performs a smooth filtering on the generated one or more binary images; and (4) determines the weight values of respective compensatory pixels in each of the one or more compensatory images according to the values of variables in a corresponding smooth filtered binary images, and determines the weight values of respective initial pixels in the initial image.

In some embodiments, when calculating the synthesized pixel value of each final pixel from the pixel value of the corresponding initial pixel in the initial image and the pixel value of the corresponding compensatory pixel in each of the one or more compensatory images, if the one or more compensatory images are one or more multi-channel images in which each compensatory pixel has a plurality of pixel component values, then the processor 200 (1) performs a brightness value conversion based on (a) preset conversion coefficients and (b) pixel component values of respective compensatory pixels in the one or more compensatory images, to obtain brightness values of respective compensatory pixels; (2) determines the weight values of the compensatory pixels in each of the one or more compensatory images based upon the determined brightness values of respective compensatory pixels, and determines the weight values of the initial pixels in the initial image; (3) performs a weighted averaging based on (a) the weight value and the pixel component values of each initial pixel in the initial image, and (b) the weight value and the pixel component values of each corresponding compensatory pixel in each of the one or more compensatory images, to obtain a synthesized value of each pixel component of each final pixel in the final image; and (4) determine the synthesized pixel value of each final pixel based upon the obtained synthesized values.

The processor 200 can be implemented according to the embodiments described with reference to FIG. 2 to FIG. 10.

In some embodiments, the camera shown in FIG. 11 can also include a memory storing instructions that, when executed by the processor 200, cause the processor 200 to perform a method consistent with the present disclosure, such as one of the exemplary methods described above. The memory can be a non-transitory computer-readable storage medium, such as a flash disk, a removable hard drive, a read only memory (ROM), a random access memory (RAM), a magnetic disk, or an optical disk.

In some embodiments, there is also provided an image processing device including a processor and a memory storing instructions that, when executed by the processor, cause the processor to perform a method consistent with the present disclosure, such as one of the exemplary methods described above. The memory can be a non-transitory computer-readable storage medium, such as a flash disk, a removable hard drive, a read only memory (ROM), a random access memory (RAM), a magnetic disk, or an optical disk.

In some embodiments of the present disclosure, an image captured under an initial exposure value may be compensated on a pixel to pixel basis by weighted averaging with one or more images captured under one or more higher exposure values. The SNR of the processed image can be effectively increased, and a visibility of details in, e.g., dark regions can be improved at a low cost, without the need for equipment upgrading.

While embodiments of the present disclosure have been shown and described herein, it will be obvious to those skilled in the art that such embodiments are provided by way of example only. Numerous variations, changes, and substitutions to the devices and methods will now occur to those skilled in the art without departing from the disclosure. For example, the division of modules or units is merely a division based on logical functionality, and other division is possible in the actual implementation. For example, a plurality of units or components can be combined or integrated into another system, or some features may be omitted or may not be implemented. Furthermore, a direct coupling or communication connection shown or discussed hereinabove can be replaced by an indirect coupling or communication connection via interfaces, devices or units, and may be in the form of electrical, mechanical or other coupling or communication connections.

The units illustrated as separate parts may or may not be physically separated. The components shown as units may or may not be physical units, i.e., the components may be provided at one location or distributed over a plurality of network locations. Portions or all of the units can be selected to implement the embodiments in view of actual needs.

In addition, various functional units of the embodiments of the present disclosure can be integrated in one processing unit, or provided as individual units, or two or more functional units being integrated in one unit. The integrated unit can be implemented in the form of hardware or software functional unit.

The integrated units can be stored in a computing readable storage medium if they are implemented in the form of a software functional unit and sold or used as a separate product. Based on this understanding, the portion of the technical solution of the present disclosure substantially contributing to the conventional technologies, or portions or the entirety of the technical solution, can be embodied in the form of a software product which is stored in a storage medium. The software product can comprise executable instructions causing a computer processor to execute all or part of the method according to various embodiments of the present disclosure. The storage medium may comprise various mediums such as a flash disk, a removable hard drive, a read only memory (ROM), a random access memory (RAM), a magnetic disk or an optical disk that are capable of storing program codes.

The disclosure herein is merely illustrative of the embodiments of the present disclosure with no intention to limit the scope thereof. Any equivalent structure or flowcharts made in accordance with the disclosure of the specification and the drawings may be directly or indirectly applied to other related technical fields, and those changes shall also fall within the scope of the present disclosure.

What is claimed is:

1. An image processing method comprising:
capturing an initial image of a subject based on a preset initial exposure value;
capturing a plurality of compensatory images of the subject based on a plurality of preset compensatory exposure values greater than the initial exposure value;
calculating a synthesized pixel value at a pixel coordinate position based on a pixel value of an initial pixel at the pixel coordinate position in the initial image and a pixel value of a compensatory pixel at the pixel coordinate position in the each compensatory image, wherein calculating the synthesized pixel value comprises:
for each compensatory image, determining a weight value of the initial pixel and a weight value of the compensatory pixel based on a mapping table of brightness values and corresponding weight values, a weight value for a brightness value being determined by training using a training set including a plurality of images;
generating a plurality of preliminary synthesized pixels having a one-to-one correspondence with the plurality of compensatory images, wherein for each compensatory image, the corresponding preliminary synthesized pixel is calculated by performing a weighted averaging to calculate the synthesized pixel value based on the pixel value and the weight value of the initial pixel and the pixel value and the weight value of the compensatory pixel;
calculating the synthesized pixel value as an average of the plurality of preliminary synthesized pixels; and
generating a captured image based upon the synthesized pixel value.

2. The method of claim 1, wherein the weight value of the compensatory pixel ranges from 0 to 1.

3. The method of claim 1, further comprising:
performing a smooth filtering on the weight value of the compensatory pixel and the weight value of the initial pixel.

4. The method of claim 1, wherein:
the initial image and the plurality of compensatory images are multi-channel images each having a plurality of pixel components for each pixel, and
calculating the preliminary synthesized pixel value includes:
performing a brightness value conversion based on preset conversion coefficients and pixel component values of the compensatory pixel to obtain a brightness value of the compensatory pixel;
determining the weight value of the compensatory pixel based upon the determined brightness value;
determining the weight value of the initial pixel according to the determined weight value of the compensatory pixel;
performing a weighted averaging to obtain a preliminary synthesized pixel component value for each of the pixel components based on:
the weight value and the pixel component value of the pixel component of the initial pixel, and
the weight value and the pixel component value of the pixel component of the compensatory pixel; and
determining the preliminary synthesized pixel value based upon the obtained preliminary synthesized pixel component value for each of the pixel components.

5. A device comprising:
a processor; and
a memory storing instructions that, when executed by the processor, cause the processor to:
obtain an initial image of a subject captured based on a preset initial exposure value;
obtain a plurality of compensatory images of the subject captured based on a plurality of preset compensatory exposure values greater than the initial exposure value;
calculate a synthesized pixel value at a pixel coordinate position based on a pixel value of an initial pixel at the pixel coordinate position in the initial image and a pixel value of a compensatory pixel at the pixel coordinate position in the each compensatory image, wherein calculating the synthesized pixel value comprises:
for each compensatory image, determining a weight value of the initial pixel and a weight value of the compensatory pixel based on a mapping table of brightness values and corresponding weight values, a weight value for a brightness value being determined by training using a training set including a plurality of images; and
generating a plurality of preliminary synthesized pixels having a one-to-one correspondence with the plurality of compensatory images, wherein for each compensatory image, the corresponding preliminary synthesized pixel is calculated by performing a weighted averaging to calculate the synthesized pixel value based on the pixel value and the weight value of the initial pixel and the pixel value and the weight value of the compensatory pixel;
calculating the synthesized pixel value as an average of the plurality of preliminary synthesized pixels; and
generate a captured image based upon the synthesized pixel value.

6. The device of claim 5, wherein the instructions further cause the processor to:
perform a smooth filtering on the weight value of the compensatory pixel and the weight value of the initial pixel.

7. The device of claim 5, wherein:

the initial image and the plurality of compensatory images are multi-channel images each having a plurality of pixel components for each pixel, and the instructions further cause the processor to:

perform a brightness value conversion based on preset conversion coefficients and pixel component values of the compensatory pixel to obtain a brightness value of the compensatory pixel;

determine the weight value of the compensatory pixel based upon the determined brightness value;

determine the weight value of the initial pixel according to the determined weight value of the compensatory pixel;

perform a weighted averaging to obtain a preliminary synthesized pixel component value for each of the pixel components based on:

the weight value and the pixel component value of the pixel component of the initial pixel, and the weight value and the pixel component value of the pixel component of the compensatory pixel; and determine the preliminary synthesized pixel value based upon the obtained preliminary synthesized pixel component value for each of the pixel components.

8. A system, comprising:

a camera configured to capture images; and a processor coupled to the camera and configured to:

control the camera to capture an initial image of a subject based on a preset initial exposure value;

control the camera to capture a plurality of compensatory images of the subject based on a plurality of preset compensatory exposure values greater than the initial exposure value;

calculate a preliminary synthesized pixel value at a pixel coordinate position based on a pixel value of an initial pixel at the pixel coordinate position in the initial image and a pixel value of a compensatory pixel at the pixel coordinate position in the each compensatory image, wherein calculating the synthesized pixel value comprises:

for each compensatory image; determining a weight value of the initial pixel and a weight value of the compensatory pixel based on a mapping table of brightness values and corresponding weight values, a weight value for a brightness value being determined by training using a training set including a plurality of images; and generating a plurality of preliminary synthesized pixels having a one-to-one correspondence with the plurality of compensatory images, wherein for each compensatory image, the corresponding preliminary synthesized pixel is calculated by performing a weighted averaging to calculate the synthesized pixel value based on the pixel value and the weight value of the initial pixel and the pixel value and the weight value of the compensatory pixel;

calculating the synthesized pixel value as an average of the plurality of preliminary synthesized pixels; and generate a captured image based upon the synthesized pixel value.

9. The system of claim 8, wherein:

the processor is further configured to perform a smooth filtering on the weight value of the compensatory pixel and the weight value of the initial pixel.

10. The system of claim 8, wherein:

the initial image and the plurality of compensatory images are multi-channel images each having a plurality of pixel components for each pixel, and calculating the preliminary synthesized pixel value includes:

performing a brightness value conversion based on preset conversion coefficients and pixel component values of the compensatory pixel to obtain a brightness value of the compensatory pixel;

determining the weight value of the compensatory pixel based upon the determined brightness value;

determining the weight value of the initial pixel according to the determined weight value of the compensatory pixel;

performing a weighted averaging to obtain a preliminary synthesized pixel component value for each of the pixel components based on:

the weight value and the pixel component value of the pixel component of the initial pixel, and the weight value and the pixel component value of the pixel component of the compensatory pixel; and determining the preliminary synthesized pixel value based upon the obtained preliminary synthesized pixel component value for each of the pixel components.

* * * * *